United States Patent [19]
Arnett

[11] Patent Number: 5,238,426
[45] Date of Patent: Aug. 24, 1993

[54] UNIVERSAL PATCH PANEL FOR COMMUNICATIONS USE IN BUILDINGS

[75] Inventor: Jaime R. Arnett, Fishers, Ind.

[73] Assignee: AT&T Bell Laboratories, Murray Hill, N.J.

[21] Appl. No.: 897,207

[22] Filed: Jun. 11, 1992

[51] Int. Cl.[5] ............................................. H01R 13/74
[52] U.S. Cl. ..................................... 439/557; 248/27.3
[58] Field of Search ...................... 439/557, 676, 558; 248/27.3

[56] References Cited

U.S. PATENT DOCUMENTS

| | | | |
|---|---|---|---|
| 4,168,874 | 9/1979 | Weidler et al. | 439/557 |
| 4,829,564 | 5/1989 | Jarvis | 439/540 |
| 4,934,785 | 6/1990 | Mathis et al. | 350/96.21 |
| 5,041,018 | 8/1991 | Arnett | 439/536 |
| 5,096,439 | 3/1992 | Arnett | 439/536 |

*Primary Examiner*—Gary F. Paumen
*Attorney, Agent, or Firm*—Edward W. Somers; Donald E. Hayes, Jr.

[57] ABSTRACT

A patch panel which includes an array of connectors includes a panel plate (22) having an array of openings (24,24) formed therein. Each opening is capable of receiving an adapter (30) which may be made of a plastic material and which includes opposed depressible cantilevered beams. Each adapter on opposed top and bottom surfaces of the arms includes two wedge-shaped tabs which cooperate with depending portions of sidewalls of the adapter to secure the adapter to the panel plate. Opposed grooves (55,55) open to internal sidewall surfaces and terminate in bridge portions (58,58) adjacent to a rear of the adapter. Each groove is adapted to receive a resilient tab (68) formed in a sidewall of a connector (60) or detent member (97) of a collar (80) to be received in the adapter. When the connector or collar is seated fully in the adapter, the resilient tab or detent engages a forward surface of the bridging portion and collinear strips also formed on each sidewall of the connector or depending portions of the collar engage a rear surface of the bridging portion to secure the connector or the collar to the adapter. This arrangement allows any one of different types of connectors to be secured to the patch panel by securing the connector to an adapter which is secured to the panel plate. Rearrangements are made easily and may be made from the front or rear of the panel plate.

19 Claims, 3 Drawing Sheets

UNIVERSAL PATCH PANEL FOR COMMUNICATIONS USE IN BUILDINGS

TECHNICAL FIELD

This invention relates to a universal patch panel for communications use in buildings. More particularly, the invention relates to a patch panel which may be used for a plurality of different connective arrangements in building closets.

BACKGROUND OF THE INVENTION

In closets in buildings, connections between transmission media are made through connectors mounted on patch panels. Typically, a patch panel includes a plate having an array of openings therein. A connector is mounted in each of the openings. Connectors which are used include optical fiber connectors, coaxial connectors and copper modular connectors.

Arrangements for releasably holding connectors in a panel plate have been disclosed in the prior art. In U.S. Pat. No. 5,096,439 which issued on Mar. 17, 1992 in the name of J. R. Arnett is disclosed a plate having an opening therein. A rear side of the wall plate includes a collar for engaging the connector and holding it together with the wall plate. The collar is formed by sidewalls and top and bottom walls which connect the sidewalls. Grooves extend from a front face of the wall plate inwardly along each sidewall and terminate in a ledge. A connector such as a jack to be received in the opening in the wall plate includes a cavity for receiving a plug and a latching system formed along each of opposed sidewalls thereof. The latching system includes two collinear spaced stop members and a flexible member which includes a wedge-shaped tab. The stop members and the flexible member are spaced apart a first distance and the distance between the stop members and the front surface of the connector is a distance which corresponds to the distance between the back edges of the sidewalls and the front surface of the wall plate. The distance between the back edge of each sidewall and ledge is somewhat less than the corresponding distance on the connector. This difference provides sufficient clearance to allow the connector and wall plate to be interlocked together with only a small amount of relative movement thereafter. A tool is provided for insertion into the grooves to depress the wedge-shaped tabs when it is desired to withdraw the connector from the wall plate. See also U.S. Pat. No. 5,041,018 which issued on Aug. 20, 1991 in the name of Jamie R. Arnett.

In the prior art, connectors could only be removed from the rear of the panel. Consequently, wiring work on a prior art patch panel generally has to be carried out behind the panel. This may cause problems because of all the wiring which is disposed behind the panel. Craftspeople working behind the patch panel inadvertently may disarrange wiring or cause disconnections.

Patch panels are available that can be used for optical fiber, for coaxial cable or for copper wiring, but in the marketplace there is not one which can be used for all kinds of connectors. The collar of the plate disclosed in the above-identified U.S. Pat. No. 5,096,439 is fixed to accepting one particular kind of connector.

What is sought after and what seemingly is not available is a patch panel which may include any of several different kinds of connectors. Further, the patch panel should be such that connections may be made from the front of the panel as opposed to the requirement that craftspeople work at the rear of the panel.

SUMMARY OF THE INVENTION

The foregoing problems of the prior art patch panel systems have been overcome by the patch panel system of this invention. A device which is capable of being mounted in an opening in a panel, and which is adapted to hold a component comprises two parallel side portions, each side portion including a depending portion at each end thereof. Also included are two arm portions, each extending between corresponding ends of said side portions and connected thereto with one of the arms being hingedly connected to the side portions and being biased outwardly. Each arm portion includes at least one detent projecting from an outer surface of the arm portion such that when forces are caused to be applied to free end portions of the arm portions to cause the free end portions to be moved toward each other, the device is capable of being inserted into an opening in a panel until a face of the panel abuts the depending portions of the side portions. The application of forces is discontinued to allow relative movement between the arm portions to occur and cause the detents of the arm portions to engage with an opposite side of the panel and cooperate with the depending portions to hold the device within the panel. In a preferred embodiment, a device which is capable of being mounted in an opening in a panel, and which is adapted to hold a component comprises two parallel side portions each being made of a plastic material, each side portion including a depending portion at each end thereof. Each of two movable arms extends between corresponding ends of said side portions and is hingedly connected thereto. Each moveable arm includes two detents projecting from an outer surface of the arm such that when forces are applied to free end portions of the arms to move the free end portions toward each other, the device is capable of being inserted into an opening in a panel until a face of the panel abuts the depending portions of the side portions whereupon the application of forces is discontinued to allow the arms to move outwardly and cause the detents of each arm to snap-lock into engagement with an opposite side of the panel.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
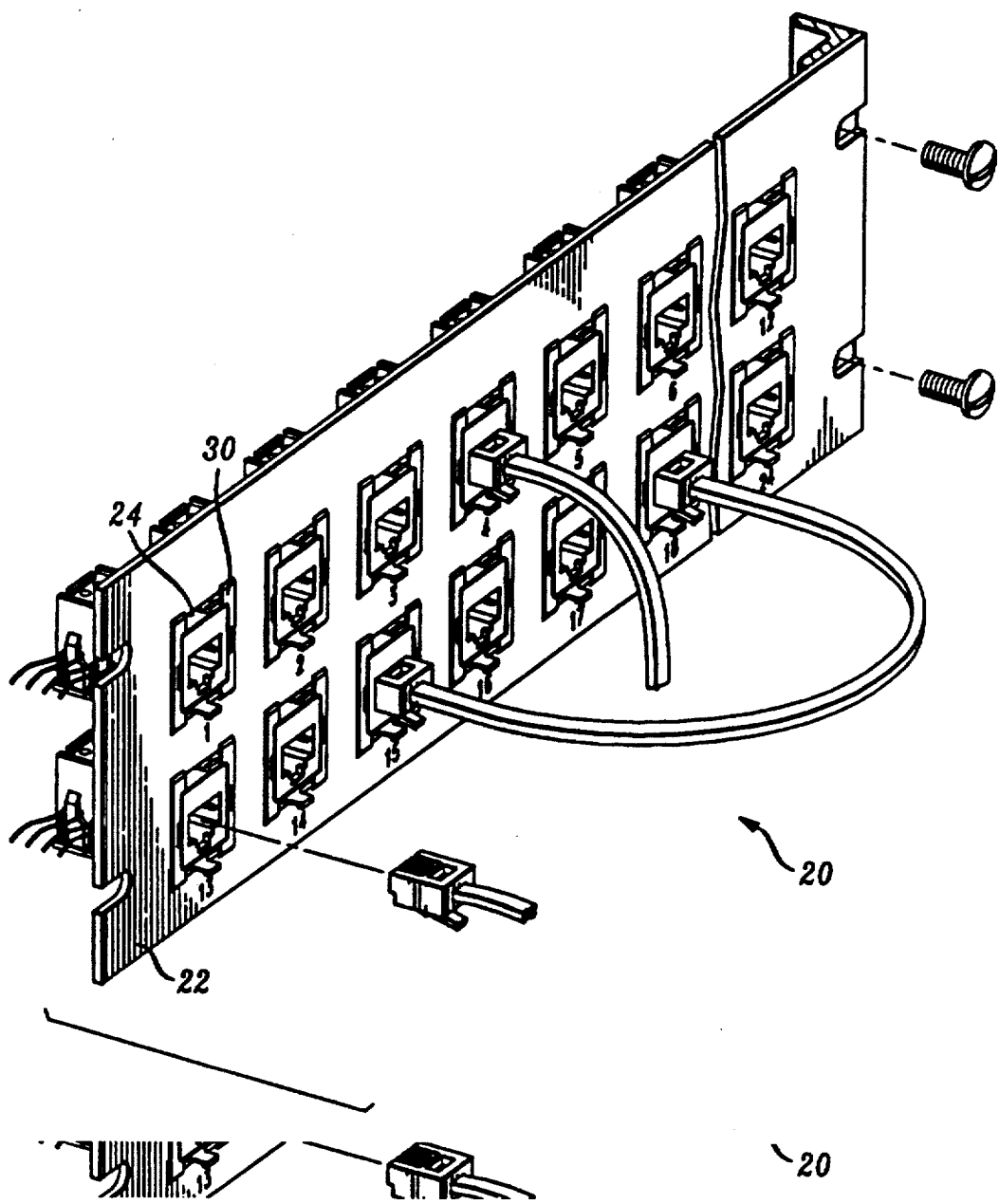
FIG. 1 is a perspective view of a patch panel system of this invention.

Referring now to FIG. 1, there is shown a patch panel system which is designated generally by the numeral 20. The patch panel system includes a panel plate 22 having a plurality of openings 24—24 formed therein. The patch panel is adapted to be supported so that the plane of the plate is oriented vertically. In each of the openings 24—24 is disposed an adapter, designated generally by the numeral 30 (see also FIG. 2).

Figure 2:
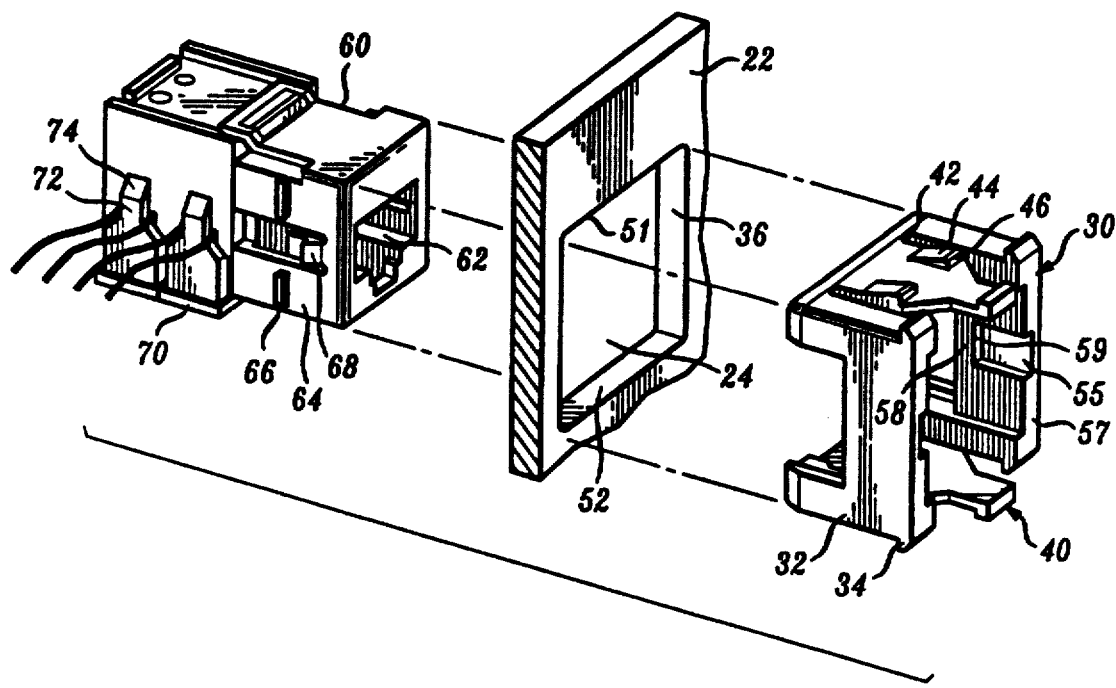
FIG. 2 is a perspective view which depicts a portion of a panel plate, an adapter which becomes disposed in an opening in the panel plate and a connector which is adapted to be mounted in the adapter.
Figure 3:
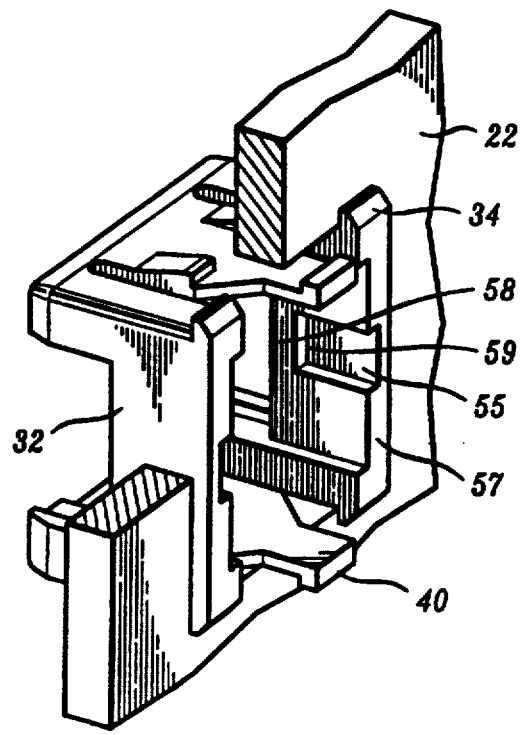
FIG. 3 is an enlarged perspective view of the adapter of FIG. 2 showing the adapter secured within the opening in the plate.

The adapter 30 is such that it may be secured to the plate 22 after the adapter has been inserted into the opening. As is seen in FIGS. 2 and 3, the adapter includes two parallel side portions 32—32 each being made of a plastic material. Further, each side portion includes a depending portion 34 at each end thereof. The side portions are spaced sufficiently apart to clear side surfaces 36—36 which define the opening 24.

Two moveable portions such as arms 40—40 are provided. Also, the adapter 30 may be provided with one fixed arm and one moveable arm. Each arm 40 extends between and connected through plastic hinges 42—42 to corresponding ends of the side portions. Each moveable portion 40 includes two detents 44—44 which are spaced apart on an outer surface thereof. Each detent is wedge-shaped and includes a panel-engaging surface 46. Slots 48—48 are provided between each moveable portion and the sidewalls. The detents 44—44 are formed so that the distance between the surface 46 of the detent and an associated depending portion 34 as measured in a direction parallel to the slots 48—48 is slightly greater than the thickness of the panel plate 22.

In FIG. 3 is shown a perspective view of a portion of the panel plate 22 with a portion thereof broken away to show an adapter 30 seated in an opening 24 of the panel plate. As is seen, outer surfaces of the side portions 32—32 engage surfaces 36—36 which define the opening 24. As the adapter is moved into the opening 24, top and bottom surfaces 51 and 52 (see FIG. 2) which, together with the side surfaces 36—36 define the opening 24, ride along the wedge-shaped detents 44—44. This causes forces to be applied to the detents and hence the moveable arms to be cammed inwardly toward each other. The inward movement of the adapter 30 continues until an outer front face of the panel plate engages the depending portions 34—34. When this engagement occurs, the surfaces 46—46 of the detents have just cleared the panel plate and the resiliency of the moveable arms allows the arms to spring-return to their initial position before insertion. This causes the detents to snap-lock behind the panel plate and to cooperate with the depending portions 34—34 to secure the adapter within the panel plate.

As should be apparent, when it is desired to remove the adapter 30 from the panel plate 22, a craftsperson applies forces to the free end portions of the cantilever arms 40—40 to move the arms toward each other. Such movement is carried out to disengage the detents 44—44 from the rear surface of the panel plate 22 and permit withdrawal of the adapter from the panel plate.

As can best be seen in FIGS. 2 and 3, inner portions of the sidewalls 32—32 also are formed with grooves 55—55, each opening to a front surface 57 of the associated sidewall and each terminating in an inner wall surface 59. The inner wall surface 59 of each groove 55 is spaced from a rear of the associated sidewall by a bridge portion 58.

The grooves 55—55 are adapted to cooperate with portions of connectors which are inserted into the adapter to hold the connector secured to the adapter. For example, as is seen in FIG. 2, a connector includes a jack portion 60 which includes a cavity 62 for receiving a modular plug (not shown). Each sidewall 64 of the jack portion is provided with two spaced tabs 66—66 and a centrally disposed latching finger 68. To secure the connector to the adapter 30, the connector is inserted into an end of the adapter which is opposite to the free ends of the cantilevered arms. Such movement is continued until the bridge portions 58—58 of the sidewalls 32—32 cam the latching fingers 68—68 inwardly to allow the latching fingers to reach the grooves 55—55. As the tabs 66—66 engage a rear surface of the sidewalls 32—32, the latching fingers 68—68 clear the bridge portions 58—58, allowing the resiliency of the latching fingers to cause them to move apart and lock into the grooves 55—55.

In order to mount a connector in the patch panel, a craftsperson pulls the connector, for example the connector 60, through the opening 24 in which it is desired to mount it and assembles the connector to an adapter 30 as described hereinabove. Then the craftsperson moves the assembly of the connector and the adapter rearwardly into the opening 24. As the adapter 30 is moved into the opening, the surfaces 51 and 52 are effective to cam the detents and arms inwardly. Movement of the connector 60 and the adapter 30 is continued until the depending portions 34—34 engage the panel plate 22. At that time, the surfaces 46—46 clear the panel plate allowing the arms to move resiliently outwardly from each other. The detents 44—44 cooperate with the depending portions 34—34 to secure the adapter and hence the connector to the panel plate. Of course, the craftsperson could depress the arms 40—40 during the insertion process, but this is not necessary.

In an alternative manner of mounting connectors in the panel plate 22, a craftsperson may insert an adapter 30 into each opening 24 and cause the adapters to be secured to the panel plate. Then a connector is caused to be mounted in each selected adapter.

It should be observed that after a connector has been assembled to an adapter, movement of the arms 40—40 inwardly toward each other is restricted. This prevents excess movement and possible overstressing of the arms.

Should it become desirable or necessary to rearrange connectors, a craftsperson depresses the arms 40—40 of the adapter in which the connector to be moved is mounted and moves the adapter forward out of the opening in the panel plate. During the demounting of the adapter from the panel plate, the connector such as the connector 60, for example, is still secured to the adapter. Then the craftsperson disassembles the connector from the adapter and moves it rearwardly through the opening and then laterally to the new desired location whereat it is brought forward through the opening at the new location and secured to an adapter after which the adapter is mounted in the panel plate at the new desired location.

In another method of removing connectors from the patch panel, a craftsperson may remove the connector from the rear of the panel plate, leaving the associated adapter mounted in the panel plate. Of course, it seems more advantageous to work on connections from the front of the panel plate, particularly if it is desired to perform work only on one connector.

The removal of a connector 60 from an adapter 30 is facilitated by a tool 70. See FIG. 2. The tool 70 is U-shaped and includes two side beams 72—72 each having a wedge-shaped free end 74. In order to remove the connector 60 from its associated adapter, the tool 70 is oriented so that the wedge-shaped ends 74—74 are aligned with the grooves 55—55. The tool 70 is moved toward the connector to cause the wedge-shaped ends 74—74 to become disposed between the latching fingers 68—68 and the grooves 55—55. This causes the latching fingers to be depressed and further inward movement of the tool 70 causes the connector 60 to be moved rearwardly out of engagement with the adapter 30. Afterwards, the tool may be stored on the connector 60 where it also may be used to cause insertion of conductors into slots of metallic contact elements. The tool 70 and its association with a connector are disclosed in previously mentioned U.S. Pat. No. 5,096,439 which is incorporated by reference hereinto.

In order to prevent dust from the portion of a room in front of the panel plate from entering the opening of the adapter 30 and moving into contact with adjacent connections at the rear of the connector, a dust cover (not shown) is assembled to the adapter. The dust cover which also is disclosed in U.S. Pat. No. 5,096,439, includes side legs which are received in grooves 55—55 of the adapter.

Of course, it should be realized that other kinds of arrangements may be used to secure a connector to the adapter. What is important is that each connector to be used with an adapter has facilities which cooperate with portions of the adapter to cause the connector to be secured releasably to the adapter.

The adapter 30 may have any one of plurality of collars mounted therein. Each collar is designed to be associated with a particular connector. Therefore when it is desired to present a particular connector in a panel plate, a collar associated with that connector is inserted into the adapter and the connector is assembled to the collar.

A connector 60 which includes a modular jack with split beam contacts, causing electrical connections to be made with the jack wires has been described earlier herein. Collars must be available for use with cylindrically shaped connectors such as coaxial connectors and AT&T's ST ® connector. See U.S. Pat. No. 4,934,785 which issued on Jun. 19, 1990 in the names of T. D. Mathis and C. M. Miller.

One collar 80 (see FIG. 4) is cup-shaped and includes a front wall 82 having an opening 83 therein for receiving a tubular connector 84. Extending from the front wall are sidewalls 86—86 and top and bottom walls 88—88. Each sidewall 86 includes side portions 89 and 91 which are adjacent to the top and bottom walls 88—88 and which have depending portions 92 and 93 at free ends thereof. The side portions 89 and 91 are separated from a center portion 94 by slots 95 and 96. Further, on the outer surface of the center portion 94 is disposed a wedge-shaped detent 97 and a release member 98. The release member 98 is oriented toward one of the side portions and the detent 97 toward the other side portion.

Figure 4:
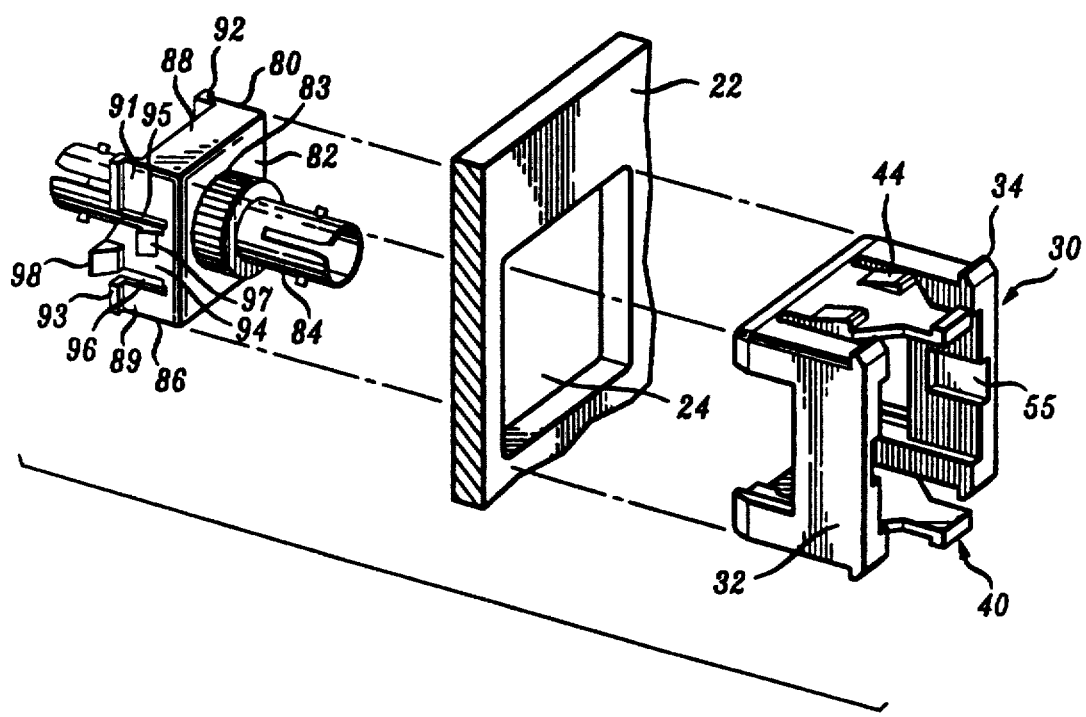
FIG. 4 is a perspective view of a portion of a panel plate, an adapter which becomes disposed in an opening in the panel plate and a collar having a tubular connector assembled thereto.

A tubular connector is inserted through the opening 83 in the front wall of a collar and secured therein. Then the collar 80 is oriented as shown in FIG. 4 so that the center portion of each sidewall is aligned with one of the grooves 55 in the adapter. The collar is moved toward the rear of the adapter which causes the detents 97—97 to be cammed inwardly by the bridge portions 58—58 of the adapter. This causes the center portions 94—94 to be depressed, allowing further movement of the collar until the depending portions 92 and 93 engage the rear surface of the side portions 32—32 of the adapter. At that time, each wedge-shaped detent 97 has cleared a bridge portion 58 of the adapter, allowing the center portions to be moved resiliently outwardly to capture each adapter sidewall between the wedge-shaped detent 97 and the depending portions 92 and 93. The distance measured in a direction along the slots 95 and 96 between the detent 97 and the depending portions 92 and 93 is slightly greater than the distance between the groove 55 of the adapter and a rear face of a bridge portion 58.

The collar is removable separately from the adapter 30 or it may be separated together with the adapter 30 from the panel plate. In order to disassemble the collar from the adapter, a craftsperson causes forces to be applied to the release members and toward each other. Such forces cause the center portions 94 to be moved toward each other and hence cause the detents 97—97 to be disengaged from the adapter grooves 55—55, thereby allowing withdrawal of the connector from the adapter.

It is to be understood that the above-described arrangements are simply illustrative of the invention. Other arrangements may be devised by those skilled in the art which will embody the principles of the invention and fall within the spirit and scope thereof.

I claim:

1. A device which is capable of being mounted in an opening in a panel, and which is adapted to hold a component, said device comprising:

two parallel side portions, each side portion including a depending portion at each end thereof; and two arm portions, each extending between corresponding ends of said side portions and connected thereto with one of said arms being hingedly connected to said side portions and being biased outwardly, each arm portion including at least one detent projecting from an outer surface of said arm portion such that when forces are caused to be applied to free end portions of said arm portions to cause relative movement of the free end portions toward each other, the device is capable of being inserted into an opening in a panel until a face of the panel abuts the depending portions of the side portions whereupon the application of forces is discontinued to allow relative movement between the arm portions to occur and cause the detents of the arm portions to engage a side of the panel opposite from the free end portions and cooperate with the depending portions to hold said device within the panel.

2. A device which is capable of being mounted in an opening in a panel, and which is adapted to hold a component, said device comprising:

two parallel side portions each being made of a plastic material, each side portion including a depending portion at each end thereof; and two moveable portions, each extending between corresponding ends of said side portions and hingedly connected thereto and each being biased resiliently outwardly, each moveable portion including two detents projecting from an outer surface of said moveable portion such that when forces are caused to be applied to free end portions of said moveable portions to cause the free end portions to be moved toward each other, the device is capable of being inserted into an opening in a panel until a front surface of the panel abuts the depending portions of the side portions whereupon the application of forces is discontinued to allow the moveable portions to move outwardly and cause said detents to snap-lock into engagement with a surface of the panel opposite from the free end portions.

3. The device of claim 2, wherein each of said detents is wedge-shaped with the portion thereof having the least thickness being oriented toward that portion of the device which is first inserted into the opening in the panel.

4. The device of claim 3, wherein both said moveable portions are biased outwardly to cause said detents to abut opposed surfaces which define the opening into which the device is inserted.

5. The device of claim 4, wherein when the front surface of said panel engages said depending portions and when said device is fully inserted, the discontinuation of the application of forces to said moveable portions allows said moveable portions to move outwardly and cause end faces of said detents, which end faces are adjacent to the depending portions of the side portions, to engage the opposite surface of said panel.

6. The device of claim 5, wherein each of said side portions includes an inwardly facing surface which is provided with a groove which extends from a front end portion of said device toward an opposite end portion of said side portion, a modular jack which is adapted to become disposed in an opening formed by said side portions and which is provided with depressible detents on opposite sides of the modular jack, each of the detents having associated therewith two spaced, collinear projections so that when the modular jack is inserted into the opening in said device, the detents are depressed toward each other and ride over bridge portions of said side portions until the projections abut an outer surface of said side portion whereupon each depressible detent is aligned with the groove on the associated side portion and is biased outwardly to cause the detents to snap-lock into said grooves of said side portions.

7. The device of claim 6, wherein said moveable portions are sufficiently moveable toward each other to disengage said detents from the panel to allow withdrawal of said device from the opening in the panel.

8. The device of claim 7, wherein the distance between a plane which extends through inner surfaces of the depending portions which engage the panel and a plane through those end faces of the wedge-shaped detents which are adjacent to the inner surfaces of the depending portions of the side portions is slightly greater than the thickness of the panel.

9. A patch panel which comprises:
a panel plate having an array of openings formed therein; and
a device which is mounted in an opening in a panel plate, and which is adapted to hold a component, said device comprising:
two parallel side portions, each side portion including a depending portion at each end thereof;
two arm portions, each extending between corresponding ends of said side portions and connected thereto with one of said arms being hingedly connected to said side portions and biased outwardly, each arm portion including at least one detent projecting from an outer surface of said arm portion such that when forces are caused to be applied to free end portions of said arm portions to cause relative movement of the free end portions toward each other, the device is capable of being inserted into an opening in a panel until a face of the panel abuts the depending portions of the side portions whereupon the application of forces is discontinued to allow relative movement between the arm portions to occur and cause the detents of the arm portions to engage with a side of the panel opposite from the free end portions and cooperate with the depending portions to hold said device mounted within said opening in said panel plate.

10. A patch panel which comprises:
a panel plate having an array of openings formed therein; and
an adapter which is mounted in an opening in a panel plate, and which is adapted to hold a component, said adapter comprising:
two parallel side portions each being made of a plastic material, each side portion including a depending portion at each end thereof; and
two moveable arm portions, each extending between corresponding ends of said side portions and hingedly connected thereto and each being biased resiliently outwardly, each moveable arm portion including two detents projecting from an outer surface of said moveable arm portion such that when forces are caused to be applied to free end portions of said moveable arm portions to cause the free end portions to be moved toward each other, the adapter is capable of being inserted into an opening in said panel plate until a front surface of the panel plate abuts the depending portions of the side portions whereupon the application of forces is discontinued to allow the moveable arm portions to move outwardly and cause said detents to snap-lock into engagement with a surface of the panel plate opposite from the free end portions to hold said adapter mounted within the opening in the panel plate.

11. The patch panel of claim 10, wherein each of said detents is wedge-shaped with the portion thereof having the least thickness being oriented toward that portion of the adapter which is first inserted into the opening in the panel plate.

12. The patch panel of claim 11, wherein said moveable arm portions are biased outwardly sufficiently to require their relative movement toward each other to withdraw said adapter from said panel plate.

13. The patch panel of claim 12, wherein when said front surface of said panel plate engages said depending portions when said device is fully inserted, the discontinuation of the application of forces to said moveable arm portions allows said moveable arm portions to move outwardly and cause end faces of said detents to engage an opposite surface of said panel plate.

14. The patch panel of claim 13, wherein each of said side portions includes an inwardly facing surface which is provided with a groove which extends from a front end portion of said device toward an opposite end portion of said side portion, a modular jack which is adapted to become disposed in an opening formed by said side portions and said moveable portions being provided with depressible detents on opposite sides of the modular jack, each of the detents having associated therewith two spaced, collinear projections so that when the modular jack is inserted into the opening in said adapter, the detents are depressed toward each other and ride over bridge portions of said side portions until the projections abut an outer surface of said side portion whereupon each depressible detent is aligned with the groove on the associated side portion and is biased outwardly to cause the detents to snap-lock into said grooves of said side portions.

15. The patch panel of claim 14, wherein said moveable arm portions are sufficiently moveable toward each other to disengage said detents from the panel plate to allow withdrawal of said adapter from the opening in the panel.

16. The patch panel of claim 14, wherein the distance between a plane which extends through inner surfaces of the depending portions which engage the panel plate and a plane through those end faces of the wedge-shaped detents which are adjacent to the inner surfaces of the depending portions of the side portions is slightly greater than the thickness of the panel plate.

17. The patch panel of claim 16, which also includes at least one connector which is secured to one of said adapters, said connector including a latching system provided on each of opposed sides thereof, said latching system comprising two spaced colinear tabs adapted to engage a rear portion of said side portion of said adapter and a resilient latching finger which is adapted to snap-lock into an associated groove of said adapter to secure said connector to said adapter.

18. The patch panel of claim 10, which also includes a collar which is capable of being assembled to said adapter and which is capable of having a tubular connector assembled thereto, said collar including a front wall and top and bottom walls extending perpendicularly from said front wall and two sidewalls extended inwardly from said front wall, said front wall including an opening for receiving an optical fiber connector, each said sidewall including means for causing said collar to be secured to said adapter.

19. The patch panel of claim 18, wherein each said sidewall includes side portions each having a depending portion and a center portion, said center portion having a wedge-shaped detent and a release member projecting from an outer surface thereof, the depending portions and the wedge-shaped detents being effective to cause said collar to become secured to said adapter.

* * * * *